(12) United States Patent
Ko et al.

(10) Patent No.: US 8,880,924 B2
(45) Date of Patent: Nov. 4, 2014

(54) HOT-PLUGGING OF MULTI-CORE PROCESSOR

(75) Inventors: Je-Myoung Ko, Hwaseong-Si (KR); Boo-Jin Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 290 days.

(21) Appl. No.: 13/396,617

(22) Filed: Feb. 15, 2012

(65) Prior Publication Data

US 2012/0216064 A1    Aug. 23, 2012

(30) Foreign Application Priority Data

Feb. 21, 2011    (KR) .................. 10-2011-0014863

(51) Int. Cl.
*G06F 1/32*    (2006.01)
(52) U.S. Cl.
CPC ............ *G06F 1/3243* (2013.01); *G06F 1/3293* (2013.01); *G06F 1/3287* (2013.01); *Y02B 60/1203* (2013.01); *G06F 1/3206* (2013.01)
USPC ............................ 713/324; 713/320; 713/323
(58) Field of Classification Search
CPC ...... Y02B 60/142; Y02B 60/14; Y02B 60/12; Y02B 60/1203; Y02B 60/1278; Y02B 60/1282; G06F 1/3206; G06F 1/3234; G06F 1/3243; G06F 1/3287; G06F 1/3293
USPC .................... 713/320, 323, 324; 718/104
See application file for complete search history.

(56) References Cited

U.S. PATENT DOCUMENTS

| | | | |
|---|---|---|---|
| 7,490,254 B2 | 2/2009 | Clark | |
| 8,024,591 B2* | 9/2011 | Bertelsen et al. | 713/323 |
| 2008/0028244 A1* | 1/2008 | Capps et al. | 713/324 |
| 2008/0168287 A1 | 7/2008 | Berry et al. | |
| 2008/0276026 A1* | 11/2008 | Branover et al. | 710/260 |
| 2009/0328055 A1* | 12/2009 | Bose et al. | 718/105 |
| 2010/0037038 A1* | 2/2010 | Bieswanger et al. | 712/220 |
| 2010/0153763 A1* | 6/2010 | Sood | 713/324 |
| 2011/0022857 A1* | 1/2011 | Nussbaum et al. | 713/300 |
| 2011/0145615 A1* | 6/2011 | Rychlik et al. | 713/323 |
| 2011/0252260 A1* | 10/2011 | Flachs et al. | 713/324 |
| 2012/0272086 A1* | 10/2012 | Anderson et al. | 713/340 |
| 2013/0151877 A1* | 6/2013 | Kadri et al. | 713/320 |

FOREIGN PATENT DOCUMENTS

KR    100901286 B1    6/2009

* cited by examiner

*Primary Examiner* — Glenn A Auve
(74) *Attorney, Agent, or Firm* — Volentine & Whitt, PLLC

(57) ABSTRACT

A method of hot-plugging a multi-core processor includes monitoring respective workload levels of multiple processor cores, hot-plugging off a first core among the processor cores upon determining that its workload level has fallen below a lower reference value, and hot-plugging on a second core among the processor cores upon determining that its workload level has risen above an upper reference value while the first core is hot-plugged off.

9 Claims, 10 Drawing Sheets

HOT-PLUGGING OF MULTI-CORE PROCESSOR

CROSS-REFERENCE TO RELATED APPLICATIONS

This application claims priority under 35 USC §119 to Korean Patent Application No. 10-2011-0014863 filed on Feb. 21, 2011, the subject matter of which is hereby incorporated by reference.

BACKGROUND OF THE INVENTION

Embodiments of the inventive concept relate generally to multi-core processor systems. More particularly, embodiments of the inventive concept relate to techniques and technologies for hot-plugging a multi-core processor in a multi-core processor system.

Multi-core processor systems are generally designed to provide increased computing performance relative to single-core processor systems. For example, they may provide greater throughput due to increased parallelism provided by additional processor cores.

Multi-core processor systems are currently found in a wide variety of devices. Examples include portable handheld devices, which may have one processor for implementing communication functions, another processor for implementing multimedia functions, and so on.

In some multi-core processor systems, performance is constrained by a power budget. For example, a multi-core processor system may be limited to certain operating frequencies and/or operating voltages due to the availability of power. This can be the case, for example, in portable devices having limited battery life. When creating such devices, designers are generally required to consider tradeoffs between performance and power consumption.

SUMMARY OF THE INVENTION

In one embodiment, a method of hot-plugging a multi-core processor comprises monitoring respective values of at least one operating parameter for multiple processor cores in an active state, selectively deactivating at least one of the processor cores based on the monitored values, and thereafter further monitoring the respective values for the processor cores that are not deactivated, and selectively reactivating the deactivated core based on the further monitoring.

In another embodiment, a multi-core processor system comprises a multi-core processor comprising multiple processor cores, a dynamic workload monitor that generates a state transition signal according to respective workload levels of the processor cores, a hot-plug controller configured to selectively deactivate at least one of the processor cores based on the state transition signal, a time-out signal and an interrupt signal, and a timer configured to provide the time-out signal and the interrupt signal to the hot-plug controller.

In another embodiment, a method of hot-plugging a multi-core processor comprises monitoring respective workload levels of multiple processor cores, hot-plugging off a first core among the processor cores upon determining that its workload level has fallen below a lower reference value, and hot-plugging on the first core again upon determining that a workload level of a second core among the processor cores has risen above an upper reference value while the first core is hot-plugged off.

These and other embodiments can potentially reduce the power consumption of a multi-core processor system without substantial performance degradation.

BRIEF DESCRIPTION OF THE DRAWINGS

The drawings illustrate selected embodiments of the inventive concept. In the drawings, like reference numbers indicate like features.

DETAILED DESCRIPTION

Figure 1:
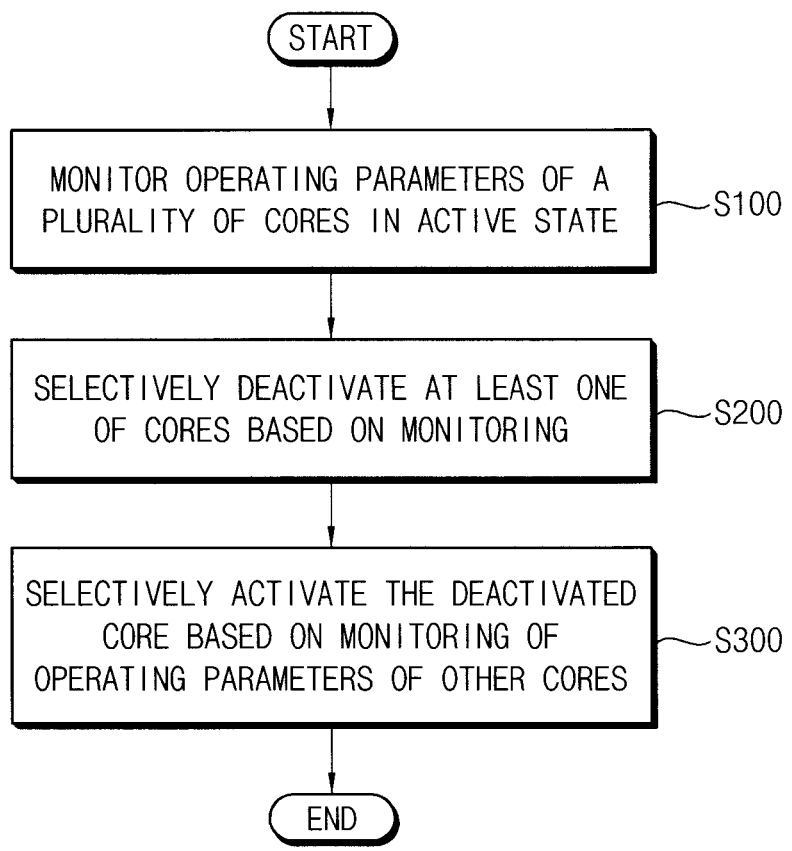
FIG. 1 is flow chart illustrating a method of hot-plugging a multi-core processor according to an embodiment of the inventive concept.

Embodiments of the inventive concept are described below with reference to the accompanying drawings. These embodiments are presented as teaching examples and should not be construed to limit the scope of the inventive concept.

In the description that follows, the terms first, second, third, etc., may be used to describe various features, but the described features should not be limited by these terms. Rather, these terms are used merely to distinguish between different features. Accordingly, a first feature described below could be termed a second feature without changing the meaning of the description.

Where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. Other terms used to describe the relationship between features should be interpreted in a similar fashion (e.g., "between" versus "directly between," "adjacent" versus "directly adjacent," etc.).

The terminology used herein is for the purpose of describing particular embodiments only and is not intended to be limiting of the inventive concept. As used herein, the singular forms "a," "an," and "the" are intended to encompass the plural forms as well, unless the context clearly indicates otherwise. The terms "comprises" and/or "comprising," where used in this specification, indicate the presence of stated features but do not preclude the presence or addition of other features. As used herein, the term "and/or" indicates any and all combinations of one or more of the associated listed items.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

The described embodiments relate generally to methods and systems that allow hot-plugging of a multi-core processor in a multi-core processor system. In general, hot-plugging is a process that allows a component to be added to or removed from a system without substantial interruption of system operation. The addition of a component in this manner can be referred to as "hot-plugging on" the component, and the removal of a component in this manner can be referred to as "hot-plugging off" the component.

Hot-plugging operations can be performed, for instance, by logically and/or physically connecting or disconnecting components from a system. In some embodiments described below, hot-plugging operations are performed by deactivating or activating certain components. Accordingly, the terms "hot-plug off" and "deactivate" may be used interchangeably, and the terms "hot-plug on" and "activate" may be used interchangeably.

FIG. 1 is flow chart illustrating a method of hot-plugging a multi-core processor according to one embodiment of the inventive concept.

Referring to FIG. 1, the method begins by monitoring operating parameters of multiple processor cores that are in an active state (S100). The monitored operating parameters can include, for instance, the respective operating frequencies or operating voltages of the processor cores. The monitored operating parameters can be used to compute the respective workload levels of the processor cores.

Next, the method deactivates, or hot-plugs off, at least one of the processor cores based on the monitored operating parameters and/or the calculated workload levels (S200). In one example of this step, the processor cores comprise two cores, and the two cores are compared to determine which as a lower workload level. Then, the processor core having the lower workload level is selected to be deactivated, or hot-plugged off. In certain modified examples, the processor core having the lower workload level is selected to be deactivated after it is detected to have the lower workload during throughout a certain time interval.

The deactivation of the selected processor core typically leads to an increase in the workload level of an unselected processor core that is not deactivated. Accordingly, the method continues to monitor processor cores that remain active, and it may reactivate the selected processor core based on the monitoring of the other processor cores (S300). For example, if the workload level of the active processor cores rises above a predetermined reference level and remains above the reference level throughout a designated time interval, the selected processor core may be reactivated, or hot-plugged on.

As explained above, the method of FIG. 1 can be performed in a multi-core processor system comprising two processor cores, but it is not limited to systems having only two processor cores. For example, in a multi-core processor system comprises first through fourth processor cores, one of the processor cores can be deactivated, or hot-plugged off, upon determining that it has the lowest workload level during throughout a time interval. The processor core to be deactivated can be identified, for instance, by performing comparisons between the workload levels of the first through fourth processor cores to determine which processor core has the lowest workload level.

Where one of the processor cores is deactivated, the workload level of one or more of the remaining three active processor cores may increase. Consequently, the deactivated processor core may be reactivated, or hot-plugged on, where at least one of the three other processor cores has a workload level above a predetermined reference level throughout a designated time interval.

The respective workload levels of different processor cores can represent various parameters, such as power consumption, operating frequency, or operating voltage of each processor core. In general, the workload level of a processor core tends to increase as any of these parameters increases. Moreover, some of these parameters are related, for instance, because power consumption tends to increase as operating frequency or voltage increases.

In general, in a digital logic circuit such as a processor core, power consumption increases when a signal is switched, i.e., when a logic state of the signal transitions from a logic high level to a logic low level or vice versa. Accordingly, increasing the operating frequency of a digital logic circuit tends to increase its rate of power consumption because it tends to increase the rate of performing switching operations. In addition, increasing the operating voltage of the processor core tends to increase power consumption as well.

The workload level of a processor core can be calculated with respect to discrete units of time. For example, one way to calculate the workload for the processor core is to first identify an active period and an idle period within each unit of time. The active period can correspond to a period in which a main clock signal is applied to the processor core, and the idle period can correspond to a period in which the main clock signal is not applied to the processor core. The active period and the idle period can be determined by an operating system (OS) such as Linux, Windows, etc. For example, after the operating system determines the idle period in a specific unit of time, the active period in that unit of time can be determined by subtracting the idle period from the total duration of that unit.

A workload rate of a processor core is defined as a ratio of a real workload that is currently performed by the processor core to a maximum workload that can be performed by the processor core. An idle rate of the processor core is defined as one minus the workload rate. Stated another way, the idle rate can be calculated as a ratio of a difference between the maximum workload and the real workload to the maximum workload that is performed by the processor core. Accordingly, a sum of the workload rate and the idle rate equals one.

In some embodiments, respective idle rates of the processor cores are calculated, and a processor core having a greatest idle rate (or an idle rate above a reference level) during a designated time interval is selected to be deactivated, or hot-plugged off. In addition, the deactivated core may be reactivated in response to a reduction of the idle rate of at least one unselected processor core. For example it may be reactivated if one unselected processor has an idle rate below a reference level throughout a designated time interval.

In the method of FIG. 1, at least one of a processor cores is hot-plugged off based on monitoring respective workload levels of multiple processor cores. This can reduce power consumption by removing operating power from the processor core that is hot-plugged off.

Figure 2:
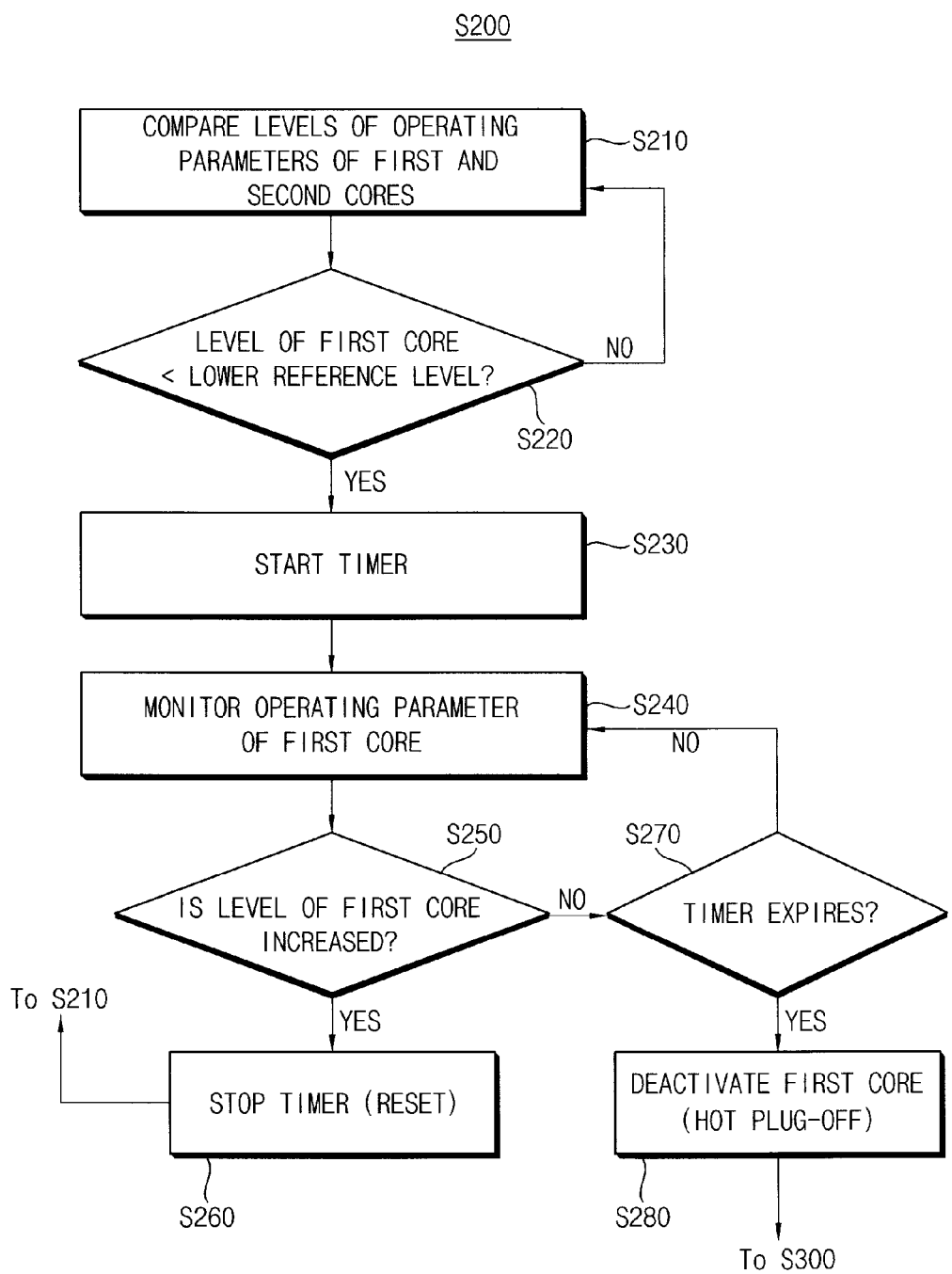
FIG. 2 is a flow chart illustrating one operation in the method of FIG. 1 according to an embodiment of the inventive concept.
Figure 3:
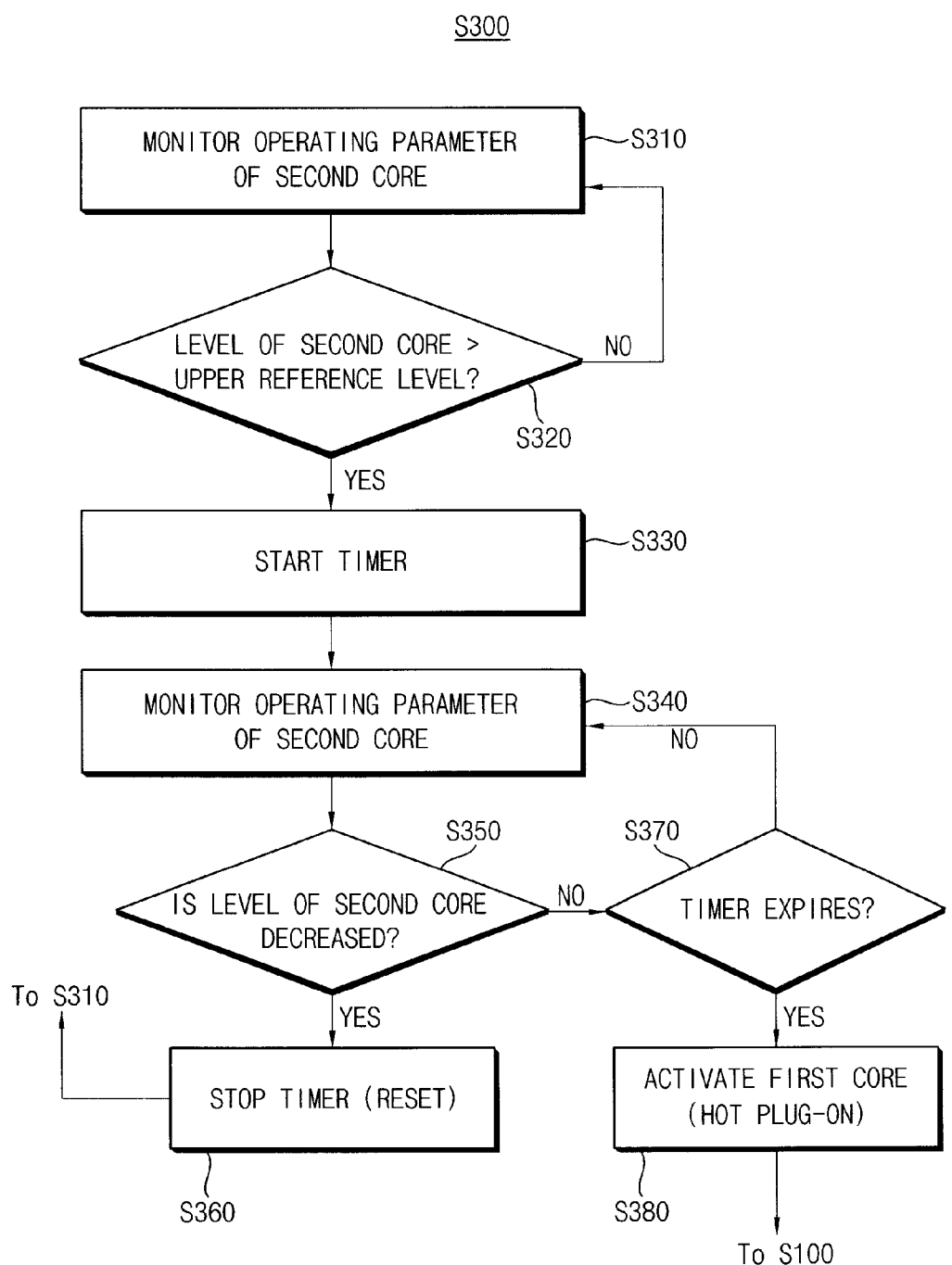
FIG. 3 is a flow chart illustrating another operation in the method of FIG. 1 according to an embodiment of the inventive concept.

FIG. 2 is a flow chart illustrating an example of operation S200 in the method of FIG. 1 according to an embodiment of the inventive concept. FIG. 3 is a flow chart illustrating an example of operation S300 in the method of FIG. 1 according to an embodiment of the inventive concept. In the example of FIGS. 2 and 3, it is assumed that the processor cores comprise first and second cores.

In step S200, as embodied in the example of FIG. 2, the respective workload levels of the first and second cores are compared with each other, and one of the cores is selected based on the comparison. More specifically, the core having the lowest workload is selected, so the selected core can also be referred to as a "lower core." In the explanation that follows, it will be assumed that the first core is the lower core, so FIG. 2 shows certain steps in which determinations are made with reference to the first core. However, these steps can be readily modified for a scenario where the second core is determined to be the lower core.

The workload level of the first and second cores are calculated based on monitored levels of operating parameters of the first and second cores. The selected core is selectively deactivated according to whether its workload level is maintained below a lower reference level throughout a first reference interval. For instance, if the workload level of the selected core is lower than the lower reference level throughout a time interval that begins with a starting of a timer and ends with expiration of the timer, the selected core is deactivated. However, if the workload level of the selected core rises above the lower reference level during the time interval, the timer is reset and step S200 starts over.

Referring to FIG. 2, the method compares the workload levels of the first and second cores, and selects the first core because it has the lower workload level (S210). Next, the method compares the workload level of the first core with a lower reference level (S220). Where the workload level of the first core is not lower than the lower reference level (S220=No), the method returns to operation S210. Otherwise (S220=Yes), a timer is started in order to determine whether the workload level of the selected core is continually lower than the lower reference level (S230).

After starting the timer, the method monitors the workload level of the first core by monitoring one or more of its operating parameters (S240). Then, it determines whether the workload level of the first core increases above the lower reference level (S250). If the workload level of the first core is determined to increase above the lower reference level before the timer expires (S250=Yes), the workload level of the first core is not considered to be continually below the lower reference level throughout the time interval beginning at the start of the timer and ending at expiration of the timer. Accordingly, the timer is reset or stopped (S260) and the method returns to step S210.

Where the workload level of the first core is not determined to increase above the lower reference level before the timer expires (S250=No), the method then determines whether the timer has expired (S270). If the timer has expired (S270=Yes), the selected core is deactivated (S280) and the method proceeds to step S300 of FIG. 1 or FIG. 3. Otherwise (S270=No), the method returns to step S240.

In step S300, as embodied in the example of FIG. 3, the workload level of the unselected core (the second core) is monitored to determine whether to reactivate the selected core. The deactivated core is reactivated again based on whether the workload level of the unselected core is higher than the upper reference level throughout another time interval between the starting of a timer and expiration of the timer. Where the workload level of the unselected core is higher than the upper reference level throughout this time interval, the selected core is reactivated again. However, if the workload level of the unselected core falls below the upper reference level during the time interval, the timer is stopped or reset and step S300 starts over.

Referring to FIG. 3, the workload level of the unselected core is monitored by monitoring one or more of its operating parameters (S310). Then, the workload level of the second core is compared with the upper reference level (S320). If the workload level of the second core is not higher than the upper reference level (S320=No), the method returns to operation S310. Otherwise (S320=Yes), a timer is started to determine whether the workload level of the second core remains above the upper reference level until expiration of the timer (S330).

After starting the timer, the method monitors the workload level of the second core (S340), and determines whether the workload level of the unselected core falls below the upper reference level before the timer expires (S350). If the workload level of the second core falls below the upper reference level before the timer expires (S350=Yes), the timer is stopped, or reset (S360), and the method returns step S310. Otherwise (S350=No), the method determines whether the timer has expired (S370).

Where the timer has not expired (S370=No), the method returns to operation S340. Otherwise, if the timer has expired (S370=Yes), indicating that the workload level of the unselected core has not fallen below the upper reference level throughout the time interval since the timer started, the selected core is hot-plugged on (S380). After the selected core is hot-plugged on, the method returns to operation S100 of FIG. 1.

Accordingly, where one of multiple processor cores is hot-plugged off, the processor core is hot-plugged on again if the workload level of at least one other core rises above the upper reference level based on monitoring the workload levels of other cores and remains above the upper reference level throughout a designated period of time. This ability to dynamically deactivate or activate a processor core allows the multi-core processor system to maintain adequate performance while reducing power consumption.

Figure 4:
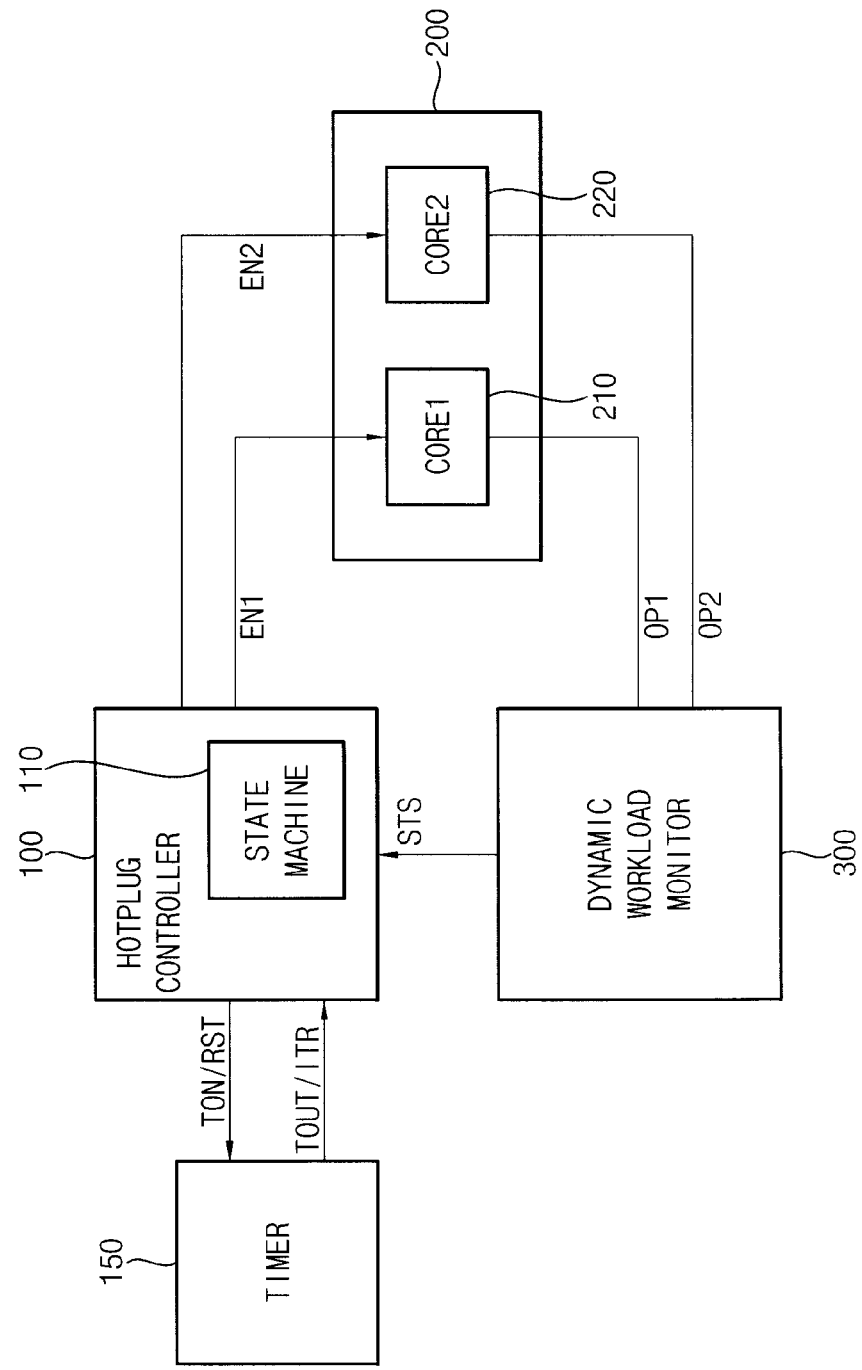
FIG. 4 is a block diagram illustrating a multi-core processor system according to an embodiment of the inventive concept.

FIG. 4 is a block diagram illustrating a multi-core processor system 10 according to an embodiment of the inventive concept.

Referring to FIG. 4, multi-core processor system 10 comprises a hot-plug controller 100, a timer 150, a multi-core processor 200 and a dynamic workload monitor 300.

Multi-core processor 200 comprises multiple processor cores. For simplicity, the following description assumes that multi-core processor 200 comprises only first and second cores 210 and 220. Nevertheless, it can be modified to include additional processor cores.

Multi-core processor 200 further comprises a processor core interface (not shown) that assigns processes to first and second cores 210 and 220 according to applications being executed. Consequently, first and second cores 210 and 220 may execute processes that have substantially the same computational cost, or they may execute processes that have different computational cost according to different applications. Moreover, the processor core interface can dynamically assign the process to first and second cores 210 and 220.

Dynamic workload monitor 300 monitors respective operating parameters OP1 and OP2 of first and second cores 210 and 220 and generates a state transition signal STS according to respective workload levels of first and second cores 210 and 220 based on operating parameters OP1 and OP2. Operating parameters OP1 and OP2 indicate respective operating voltages or respective operating frequencies of first and second cores 210 and 220.

Hot-plug controller 100 comprises a state machine 110, and it selectively deactivates at least one of first and second cores 210 and 220 based on state transition signal STS, a time-out signal TOUT and an interrupt signal ITR. State transition signal STS indicates the workload levels of first and second cores 210 and 220, and time-out signal TOUT and interrupt signal ITR are provided from timer 150. State machine 110 assumes one of various states in response to state transition signal STS, time-out signal TOUT and interrupt signal ITR. Hot-plug controller 100 selectively deactivates at least one of first and second cores 210 and 220 according to the assumed state of state machine 110. In particular, hot-plug controller 100 selectively deactivates the at least one of first and second cores 210 and 220 by generating first and second enable signals EN1 and EN2.

In addition, hot-plug controller 100 provides timer 150 with a timer-on signal TON for starting timer 150, and a reset signal RST for resetting timer 150 according to the activation or deactivation of first and second cores 210 and 220.

In addition, where first core 210 is deactivated according to the state of state machine 110, hot-plug controller 100 reactivates first core 210 where the state of second core 220 satisfies a reference condition.

Figure 5:
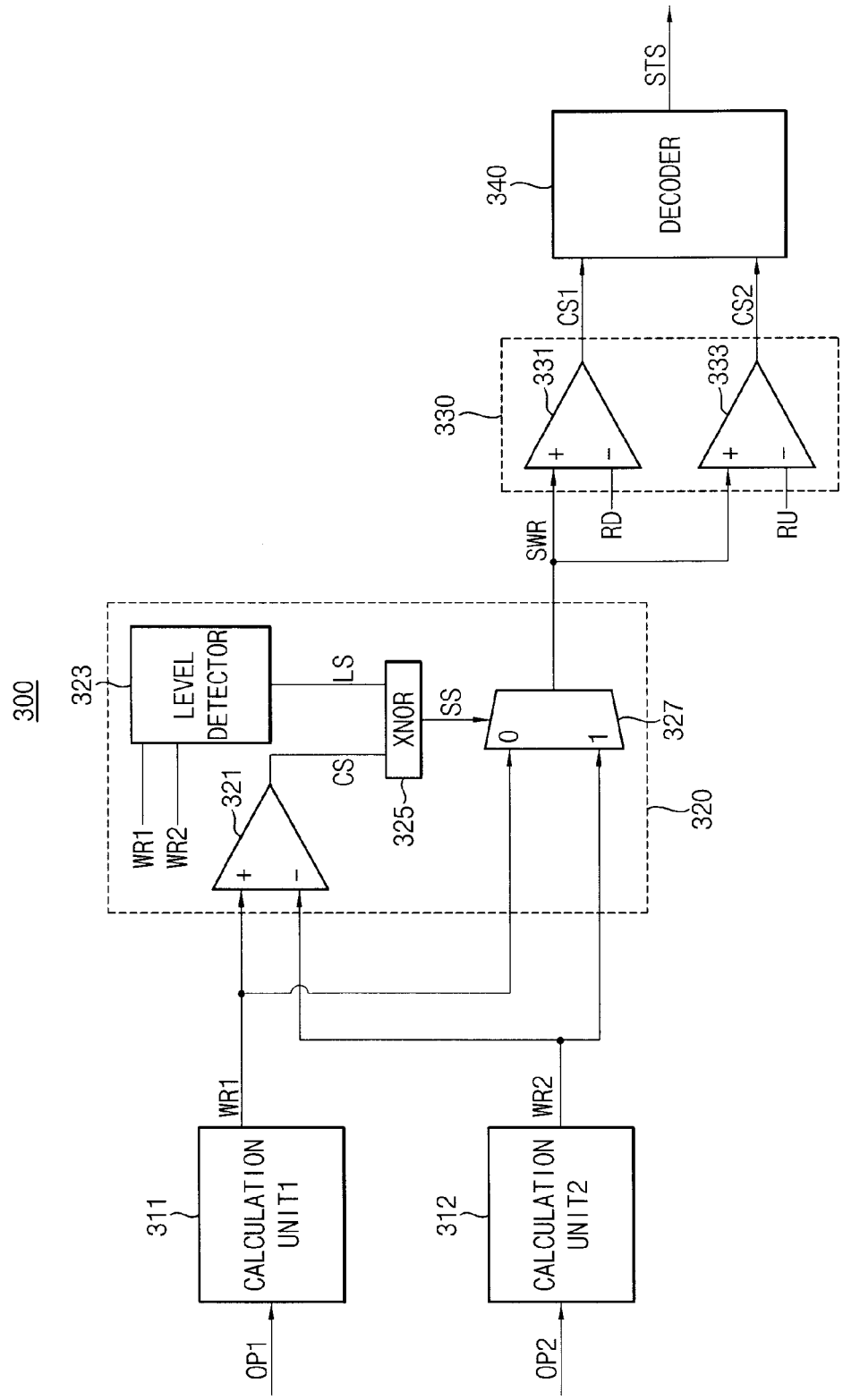
FIG. 5 is a block diagram illustrating an example of a dynamic workload monitor in FIG. 4 according to an embodiment of the inventive concept.

FIG. 5 is a block diagram illustrating an example of dynamic workload monitor 300 of FIG. 4 according to an embodiment of the inventive concept.

Referring to FIG. 5, dynamic workload monitor 300 comprises a first calculation unit 311, a second calculation unit 312, a selection unit 320, a comparison unit 330 and a decoder 340.

First calculation unit 311 calculates a first workload level WR1 of first core 210 based on operating parameter OP1 of first core 210. Second calculation unit 312 calculates a second workload level WR2 of second core 220 based on operating parameter OP2 of second core 220. As indicated above, operating parameters OP1 and OP2 represent respective operating voltages or operating frequencies of first and second cores 210 and 220.

Selection unit 320 comprises a comparator 321, a level detector 323, an exclusive NOR gate 325 and a multiplexer 327. Comparator 321 has a first (positive) input terminal that receives a signal indicating first workload level WR1 and a second (negative) input terminal that receives a signal indicating second workload level WR2. Comparator 321 compares first workload level WR1 and second workload level WR2 to output a comparison signal CS indicating a result of the comparison of first workload level WR1 and second workload level WR2.

Level detector 323 detects first workload level WR1 and second workload level WR2, and outputs a level signal LS having a logic low level when at least one of first workload level WR1 and second workload level WR2 corresponds to "zero". Level detector 323 outputs level signal LS having a logic high level when both of first workload level WR1 and second workload level WR2 do not correspond to "zero". Exclusive NOR gate 325 performs an exclusive NOR operation on comparison signal CS and level signal LS to output a selection signal SS. That is, exclusive NOR gate 325 outputs selection signal SS having a logic high level when comparison signal CS and level signal LS have the same logic levels. Multiplexer 327 selects one of first workload level WR1 and second workload level WR2 to provide a selected workload level SWR.

Comparison unit 330 comprises first and second comparators 331 and 333. First comparator 331 compares selected workload level SWR to a lower reference level RD to output a first comparison signal CS1. Second comparator 333 compares selected workload level SWR to an upper reference level RU to output a second comparison signal CS2. Decoder 340 decodes the first and second comparison signals CS1 and CS2 to output a state transition signal STS indicating respective states of first and second cores 210 and 220.

Comparator 321 outputs comparison signal CS having a logic low level where first workload level WR1 is lower than second workload level WR2. Accordingly, level detector 323 outputs level signal LS with a logic high level because both of the first and second workload levels WR1 and WR2 are not 'zero'. In addition, exclusive NOR gate 352 outputs selection signal SS having a logic low level, and thus, multiplexer 327 selects first workload level WR1 as selected workload level SWR.

Where first workload level WR1 is lower than lower reference level RD, the first and second comparison signals CS1 and CS2 are '00'. Where first workload level WR1 is higher than first lower reference level RD and lower than upper reference level RU, the first and second comparison signals CS1 and CS2 are '10'. Where first workload level WR1 is higher than upper reference level RU, first and second comparison signals CS1 and CS2 are '11'. Decoder 340 decodes first and second comparison signals CS1 and CS2 and provides hot-plug controller 100 with state transition signal STS according to the logic levels of first and second comparison signals CS1 and CS2. First and second comparison signals CS1 and CS2 generally have different logic levels according to connection of first and second comparators 331 and 333 with lower reference level RD and upper reference level RU and selected workload level SWR.

Where first workload level WR1 is lower than lower reference level RD throughout a first reference interval, hot-plug controller 100 deactivates first core 210. Where first core 210 is deactivated, first workload level WR1 is 'zero'. Therefore, comparator 321 outputs comparison signal CS with a logic low level, and level detector 323 outputs level signal LS having a logic low level. Then, exclusive NOR gate 352 outputs selection signal SS with a logic high level, and multiplexer 327 selects second workload level WR2 as selected workload level SWR. Comparison unit 330 compares second workload level WR2 with the lower and upper reference levels RD and RU to generate first and second comparison signals CS1 and CS2.

Where second workload level WR2 of second core 220 is higher than upper reference level RU throughout a designated time interval while first core 210 is deactivated, hot-plug controller 100 reactivates first core 210.

Comparator 321 outputs comparison signal CS with a logic high level where first workload level WR1 is higher than second workload level WR2. Level detector 323 outputs level signal LS with a logic high level because both of the first and second workload levels WR1 and WR2 are not 'zero'. Exclusive NOR gate 352 outputs selection signal SS with a logic high level, and thus, multiplexer 327 selects second workload level WR2 as selected workload level SWR. Where second workload level WR2 is lower than lower reference level RD, first and second comparison signals CS1 and CS2 may be '00'.

Where first workload level WR1 is higher than first lower reference level RD and lower than upper reference level RU, first and second comparison signals CS1 and CS2 are '10'. Where first workload level WR1 is higher than upper reference level RU, first and second comparison signals CS1 and CS2 are '11'. Decoder 340 decodes first and second comparison signals CS1 and CS2 and provides hot-plug controller 100 with state transition signal STS according to the logic levels of the first and second comparison signals CS1 and CS2.

Figure 6:
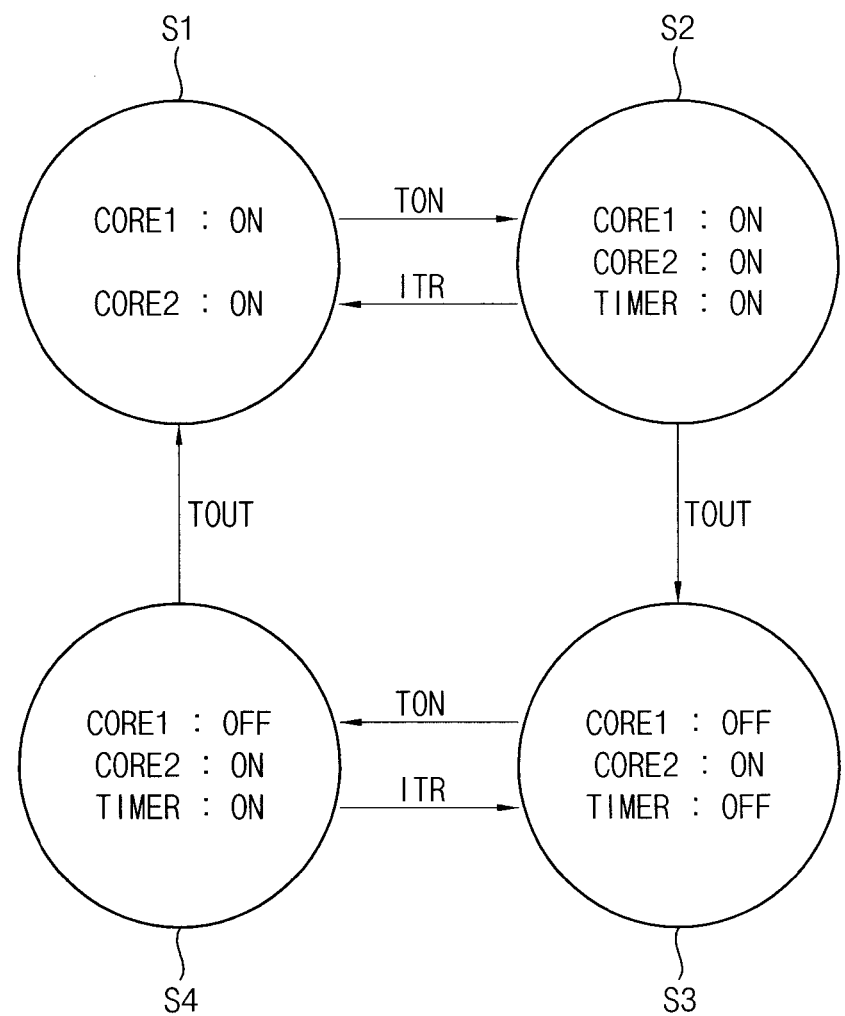
FIG. 6 is a diagram illustrating possible states of a state machine in FIG. 4.

FIG. 6 is a diagram illustrating possible states of state machine 110 of FIG. 4.

Referring to FIG. 6, state machine 110 has one of first through four states S1~S4 based on the respective workload levels of first and second cores 210 and 220, and a state of timer 150.

Where both of first and second cores 210 and 220 are in active states, i.e., where both of workload levels OP1 and OP2 of first and second cores 210 and 220 are between lower reference level RD and upper reference level RU, dynamic workload monitor 300 provides hot-plug controller 100 with state transition signal STS indicating that both of first and second cores 210 and 220 are in active states, and state machine 100 assumes first state S1 in response to state transition signal STS.

Where dynamic workload monitor 300 detects that workload level WR1 of first core 210 falls below lower reference level RD, dynamic workload monitor 300 provides hot-plug controller 100 with state transition signal STS indicating that workload level WR1 of first core 210 is lower than lower reference level RD. Hot-plug controller 100 outputs timer-on signal TON to timer 150 in response to state transition signal STS.

According to transition signal STS and timer-on signal TON, state machine 110 assumes second state S2. Timer 150 provides hot-plug controller 100 with time-out signal TOUT indicating that the first reference interval has lapsed while state machine 110 is in second state S2. That is, where workload level WR1 of first core 210 is continually lower than lower reference level RD during the first reference interval, state machine 110 transitions from second state S2 to third state S3, and hot-plug controller 100 deactivates first core 210 using first enable signal EN1.

Where workload level WR1 of first core 210 exceeds lower reference level RD before timer 150 expires in second state S2, hot-plug controller 100 outputs reset signal RTS to timer 150 in response to state transition signal STS indicating that workload level WR1 of the first core exceeds lower reference level RD before timer 150 expires. Timer 150 provides interrupt signal ITR to hot-plug controller 100 while timer 150 is reset in response to reset signal RST. When hot-plug controller 100 receives interrupt signal IRT, state machine 110 transitions from second state S2 to first state S1. Dynamic workload monitor 300 monitors workload level WR2 of second core 220 while state machine 110 is in third state S3.

Where workload level WR2 of second core 220 exceeds upper reference level RU while state machine is in third state S3, dynamic workload monitor 300 provides hot-plug controller 100 with state transition signal STS indicating that workload level WR2 of second core 220 exceeds upper reference level RU. Hot-plug controller 100 outputs timer-on signal TON to timer 150 in response to state transition signal STS, and state machine 110 transitions from third state S3 to fourth state S4.

Timer 150 provides hot-plug controller 100 with time-out signal TOUT indicating the second reference interval has lapsed while state machine 110 is in fourth state S4. That is, when workload level WR2 of second core 220 is continually higher than upper reference level RU during the second reference interval, state machine 110 transitions from fourth state S4 to first state S1, and hot-plug controller 100 reactivates first core 210 using first enable signal EN1.

Where workload level WR2 of second core 220 is below upper reference level RU before timer 150 expires in fourth state S2, hot-plug controller 100 outputs reset signal RTS to timer 150 in response to state transition signal STS indicating that workload level WR2 of second core 220 is below upper reference level RU before timer 150 expires. Timer 150 provides interrupt signal ITR to hot-plug controller 100 while timer 150 is reset in response to reset signal RST. Where hot-plug controller 100 receives interrupt signal IRT, state machine 110 transitions from fourth state S4 to third state S3. State machine 110 is implemented with software.

Figure 7:
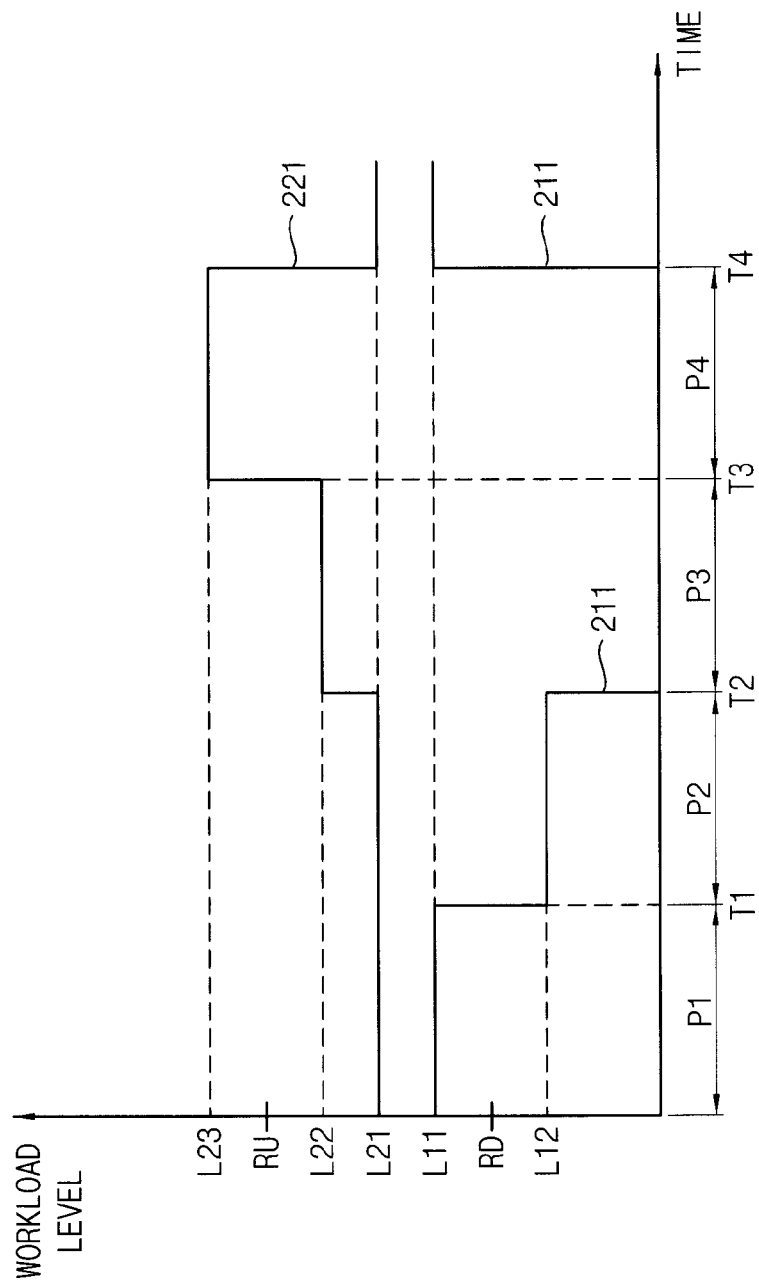
FIG. 7 is a graph illustrating workload levels of first and second cores in FIG. 4 as a function of time.

FIG. 7 is a graph illustrating the workload levels of first and second cores 210 and 220 of FIG. 4 as a function of time. In FIG. 7, a reference numeral 211 represents the workload level of first core 210 and a reference numeral 221 represents the workload level of second core 220.

Referring to FIG. 7, in a period P1 before time T1, the workload level of first core 210 is L11, and the workload level of second core 220 is L21. Period P1 corresponds to first state S1 in FIG. 6. At time T1, the workload level of first core 210 transitions to L12, which is lower than lower reference level RD, and timer 150 is started. During a period P2 between time T1 and time T2, the workload level of first core 210 is L12. Period P2 corresponds to second state S2 in FIG. 6. Because the workload level of first core 210 is L12, which is lower than lower reference level RD, throughout period P2, hot-plug controller 100 deactivates first core 210.

During a period P3 from time T2 to time T3, the workload level of second core 220 increases to a level L22 due to the deactivation of first core 210. Period P3 corresponds to third state S3 in FIG. 6. At time T3, the workload level of second core 220 transitions to L23, which is higher than upper reference level RU. Accordingly, timer 150 is started, and the workload level of second core 220 is a level L23 higher than upper reference level RU during a period P4 from time T3 to time T4. Period P4 corresponds to fourth state S4 in FIG. 6. Because the workload level of second core 210 is L23, which is higher than upper reference level RU, throughout period P4, hot-plug controller 100 reactivates first core 210. Consequently, the workload level of first core 210 increases to L11, and the workload level of second core 20 decreases to L21 after time T4. The period after time T4 corresponds to first state S1 in FIG. 6.

As indicated above, multi-core processor 200 is not limited to two processor cores as shown in FIG. 4. Accordingly, the above embodiments can be modified to accommodate additional processor cores. For example, where one of three or more processor cores is hot-plugged off, the processor core can be hot-plugged on if the workload level of at least one of the other processor cores increases above the upper reference level.

Figure 8:
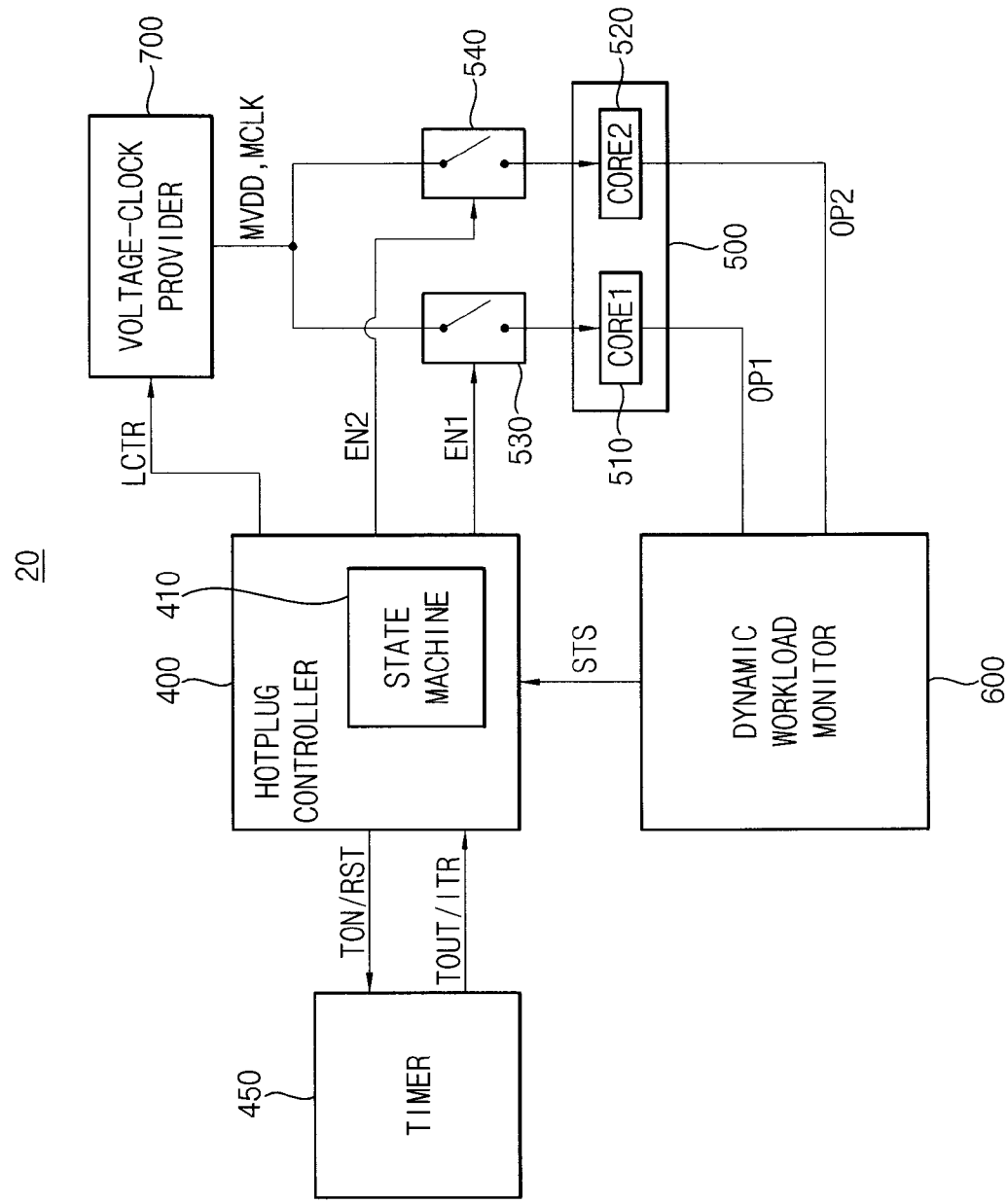
FIG. 8 is a block diagram illustrating a multi-core processor system according to another embodiment of the inventive concept.

FIG. 8 is a block diagram illustrating a multi-core processor system 20 according to another embodiment of the inventive concept.

Referring to FIG. 8, multi-core processor system 20 comprises a hot-plug controller 400, a timer 450, a multi-core processor 500, a dynamic workload monitor 600, switches 530 and 540, and a voltage-clock provider 700.

Multi-core processor 500 comprises at least first and second cores 510 and 520. For simplicity, however, an embodiment with only two cores will be described. Multi-core processor 500 further comprises a processor core interface (not illustrated). The processor core interface assigns corresponding processes to first and second cores 510 and 520 according to applications being executed. Therefore, first and second cores 510 and 520 may execute processes that have substantially the same computational cost, or they may execute processes that have different computational costs according to the applications. In either case, the processor core interface dynamically assigns the process to first and second cores 510 and 520.

Dynamic workload monitor 600 monitors respective operating parameters OP1 and OP2 of first and second cores 510 and 520 and generates a state transition signal STS according to respective workload levels of first and second cores 510 and 520 based on operating parameters OP1 and OP2. Operating parameters OP1 and OP2 can be, for example, respective operating voltages or respective operating frequencies of first and second cores 510 and 520.

Hot-plug controller 400 comprises a state machine 410, and hot-plug controller 400 selectively deactivates at least one of first and second cores 510 and 520 based on state transition signal STS, a time-out signal TOUT and an interrupt signal ITR. State transition signal STS indicates the workload levels of first and second cores 510 and 520, and time-out signal TOUT and interrupt signal ITR are provided from timer 450. That is, state machine 410 in hot-plug controller 400 has states that determine states of first and second cores 510 and 520 in response to state transition signal STS, time-out signal TOUT and interrupt signal ITR. Hot-plug controller 400 selectively deactivates at least one of first and second cores 510 and 520, according to the state of state machine 410, by generating first and second enable signals EN1 and EN2. Switches 530 and 540 are respectively turned on/off in response to first and second enable signals EN1 and EN2. Hot-plug controller 400 selectively deactivates at least one of first and second cores 510 and 520 by selectively performing clock and voltage gating on first and second cores 510 and 520 according to the states of first and second cores 510 and 520, which are determined by state machine 410.

In addition, hot-plug controller 400 provides a level control signal LCTR to voltage-clock provider 700 according to states of first and second cores 510 and 520, which are defined by state machine 410. Voltage-clock provider 700 adjusts frequency of a main clock signal MCLK which is provided to first and second cores 510 and 520 in response to level control signal LCTR, and adjusts level of a main power supply voltage MVDD in response to level control signal LCTR. Where first core 510 is deactivated, hot-plug controller 400 decreases the frequency of main clock signal MCLK and level of main power supply voltage MVDD using level control signal LCTR. Where first core 510 is reactivated, hot-plug controller 400 increases the frequency of main clock signal MCLK and the level of main power supply voltage MVDD using level control signal LCTR.

Figure 9:
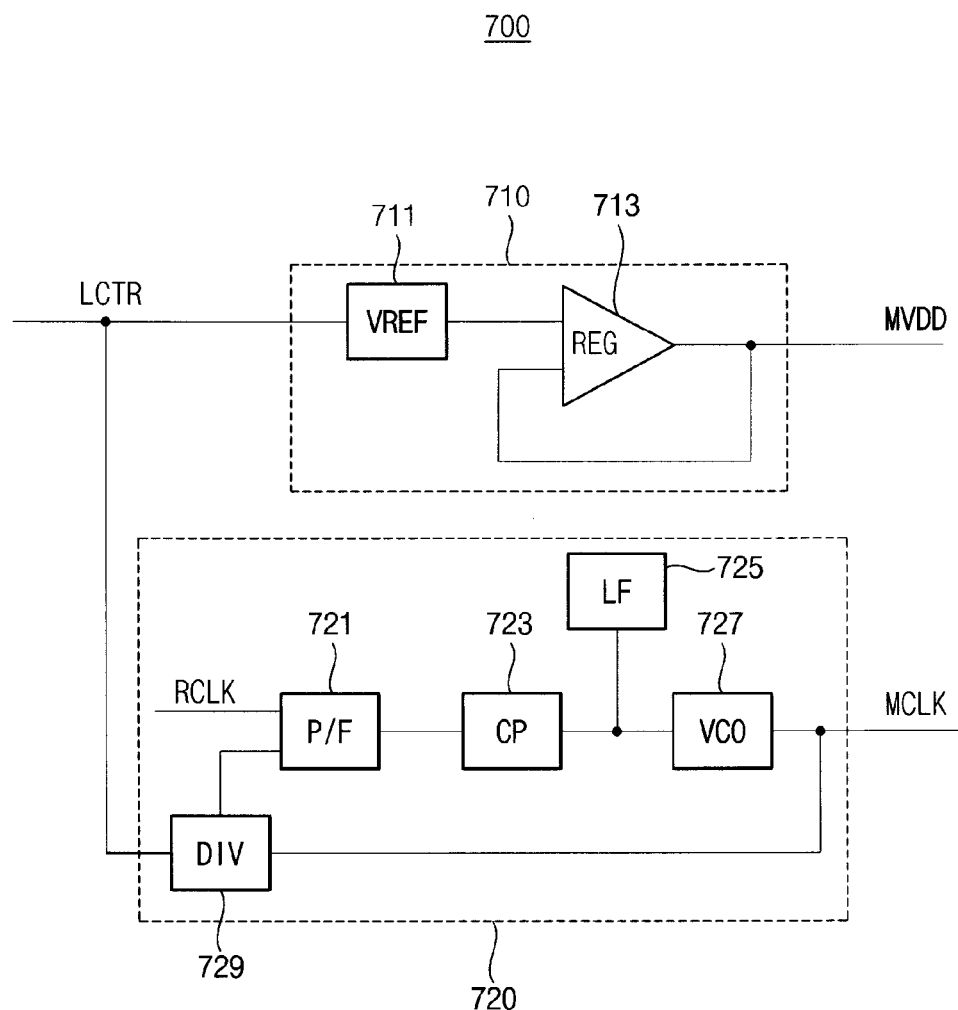
FIG. 9 is a block diagram illustrating an example of a voltage-clock provider in FIG. 8 according to an embodiment of the inventive concept.

FIG. 9 is a block diagram illustrating an example of voltage-clock provider 700 in FIG. 8 according to an embodiment of the inventive concept.

Referring FIG. 9, voltage-clock provider 700 comprises a voltage control unit 710 and a clock control unit 720.

Voltage control unit 710 comprises a reference voltage generator 711 and a regulator 713. Reference voltage generator 711 receives level control signal LCTR from hot-plug controller 400. Then, reference voltage generator 711 adjusts a reference voltage corresponding to level control signal LCTR and provides the adjusted reference voltage to regulator 713. Regulator 713 compares the adjusted reference voltage with the magnitude of main power voltage MVDD which is fed back. Then, regulator 713 provides first and second cores 510 and 520 with main power voltage MVDD, the magnitude of which corresponds to level control signal LCTR.

Clock control unit 720 is implemented by a phase locked loop (PLL). Clock control unit 720 comprises a phase/frequency detector 721, a charge pump 723, a loop filter 725, a voltage-controlled oscillator (VCO) 727 and a frequency divider 729. Frequency divider 139 receives level control signal LCTR from hot-plug controller 400, and it outputs a frequency-divided clock signal generated by dividing the frequency of main clock signal MCLK based on a frequency division ratio corresponding to level control signal LCTR. Phase/frequency detector 721 compares a reference clock signal RCLK with the frequency-divided clock signal to generate an up/down signal. Charge-pump 723 generates a control voltage based on the up/down signal. VCO 727 generates main clock signal MCLK in response to the control voltage filtered by loop-filter 725 and provides main clock signal MCLK to first and second cores 510 and 520.

The level of main power voltage MVDD and/or the frequency of main clock signal MCLK are adjusted by adjusting the output of reference voltage generator 711 and/or the frequency division ratio of frequency divider 729.

Multi-core processor system 20 of FIG. 8 is different from multi-core processor system 10 of FIG. 4 in that multi-core processor system 20 further comprises voltage-clock provider 700 and switches 530 and 540.

Figure 10:
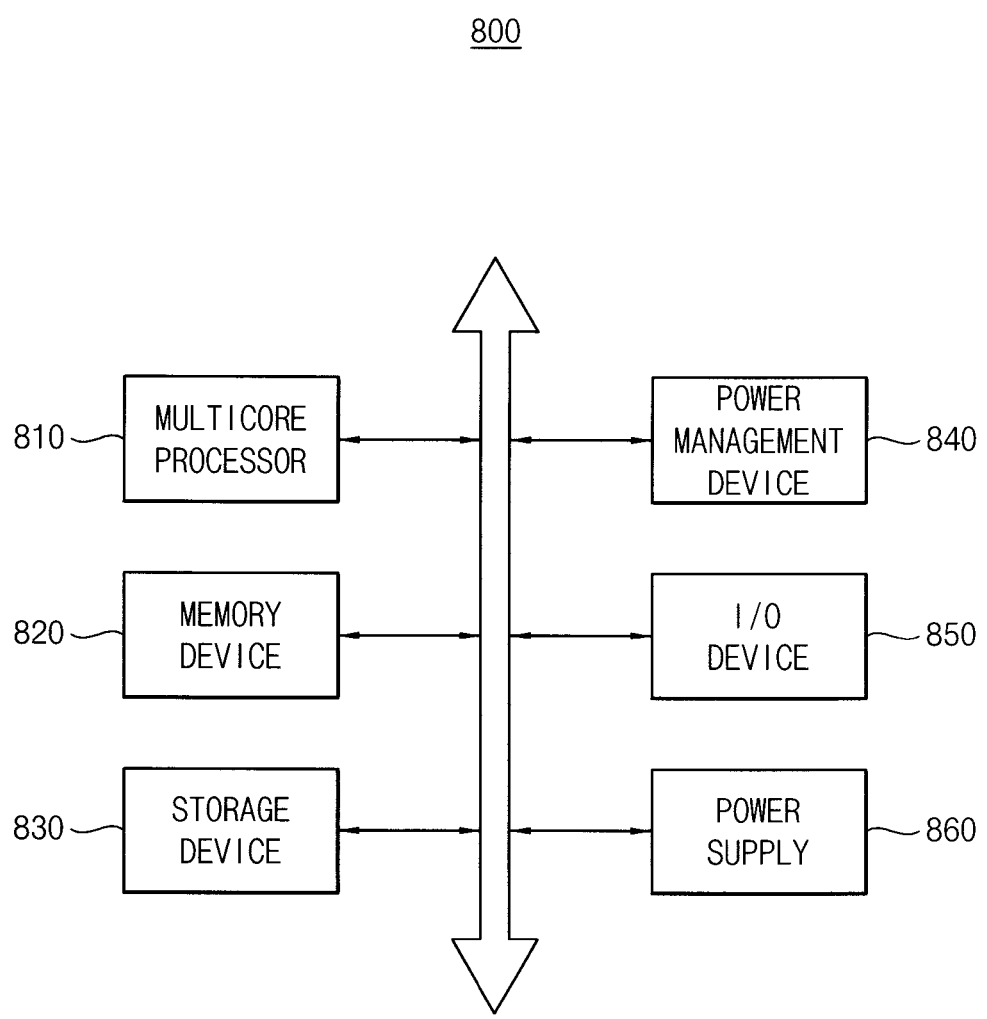
FIG. 10 is a block diagram illustrating an electronic device incorporating a multi-core processor system according to an embodiment of the inventive concept.

FIG. 10 is a block diagram illustrating an electronic device 800 incorporating a multi-core processor system according to an embodiment of the inventive concept.

Referring to FIG. 10, electronic device 800 comprises a multi-core processor 810, a memory device 820, a storage device 830, an input/output device 850, a power supply 860, and a power management device 840.

In some embodiments, power management device 840 comprises hot-plug controller 100, timer 150, and dynamic workload monitor 300 of FIG. 4. In other embodiments, power management device 840 comprises hot-plug controller 400, timer 450, dynamic workload monitor 600 and voltage-clock provider 700 of FIG. 8. Although not illustrated in FIG. 10, electronic device 800 can further comprise ports for communicating with an external device such as a video card, a sound card, a memory card, or a USB device.

Multi-core processor 810 comprises multiple processor cores, and it can perform various computing functions, such as executing software for performing specific calculations and/or tasks. Multi-core processor 810 can take various forms, such as a central processing unit (CPU) or a digital signal processor (DSP), for example. Multi-core processor 810 can also be coupled to an expansion bus, such as a peripheral-component-interconnect (PCI) bus.

The hot-plug controller in power management device 840 comprises a state machine, and the hot-plug controller selectively deactivates at least one of the processor cores and activates the deactivated core based on a state transition signal indicating the state of the processor cores based on the workload levels of the processor cores, a time-out signal, and an interrupt signal.

Multi-core processor 810 controls memory device 820, storage device 830, and input/output device 850. Memory device 820 is coupled to multi-core processor 810 via a bus, such as an address bus, a control bus, or a data bus. Memory device 820 can take any of various forms, such as a dynamic random access memory (DRAM), a static random access memory (SRAM), and/or a non-volatile memory (e.g., an erasable programmable read only memory (EPROM), an electrically erasable programmable read only memory (EEPROM), a flash memory device, etc). Storage device 830 can comprise a hard disk drive (HDD), a compact disk read only memory (CD-ROM), or a solid state drive (SSD), for example. Input/output device 850 typically comprises at least one input device (e.g., a keyboard, a keypad, a touchpad, a mouse, etc) and at least one output device (e.g., a printer, a LCD display, a speaker, etc). Power supply 860 supplies a power voltage to electronic device 800.

Embodiments of the inventive concept can be applied to various types of electronic devices including multiple processor cores, such as desktop computers, laptop computers, digital cameras, video camcorders, cellular phones, smart phones, portable multimedia players, personal digital assistants, MP3 players, and navigation devices. The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A multi-core processor system, comprising:
   a multi-core processor comprising multiple processor cores;
   a dynamic workload monitor that generates a state transition signal according to respective workload levels of the processor cores;
   a hot-plug controller configured to selectively deactivate at least one of the processor cores based on the state transition signal, a time-out signal and an interrupt signal; and
   a timer configured to provide the time-out signal and the interrupt signal to the hot-plug controller.

2. The system of claim 1, wherein the respective workload levels of the processor cores are determined according to respective values of at least one operating parameter of the processor cores.

3. The system of claim 2, wherein the at least one operating parameter comprises an operating voltage or an operating frequency.

4. The system of claim 3, wherein the hot-plug controller comprises a state machine configured to determine respective states of the processor cores based on the state transition signal, the time-out signal, and the interrupt signal.

5. The system of claim 4, wherein the hot-plug controller provides the timer with a timer-on signal to start the timer and a reset signal to reset the timer, based on the respective states of the processor cores determined by the state machine.

6. The system of claim 4, wherein the processor cores comprise first and second cores, and wherein the hot-plug controller reactivates the deactivated first core upon determining that the workload level of the second core is higher than an upper reference level during a reference time.

7. The system of claim 4, wherein the processor cores comprise first and second cores, and wherein the dynamic workload monitor comprises:
   a first calculation unit that calculates a first workload level of the first core based on a value of a first operating parameter for the first core;
   a second calculation unit that calculates a second workload level of the second core based on a value of the operating parameter for the second core;
   a selection unit that compares the first and second workload levels to select one of the first and second cores, the selected core having a lower value of the operating parameter than the unselected core;
   a comparison unit that compares the value of the operating parameter for the selected core with an upper reference level and a lower reference level to provide first and second comparison signals; and
   a decoder that decodes the first and second comparison signals to provide the state transition signal.

8. The system of claim 7, wherein the selection unit comprises:
   a comparator that compares the first and second workload levels and outputs a comparison signal based on the comparison;
   a level detector that outputs a level signal having a logic low level when one of the first and second workload levels is zero;
   an exclusive NOR gate that performs an exclusive NOR operation on the comparison signal and the level signal to provide a selection signal; and
   a multiplexer that selects one of the first and second workload levels in response to the selection signal.

9. The system of claim 1, further comprising a processor core interface configured to distribute processes among the multiple processor cores.

\* \* \* \* \*